United States Patent
Edwards et al.

(10) Patent No.: US 10,883,408 B2
(45) Date of Patent: Jan. 5, 2021

(54) SEMI-EMPIRICAL ENGINE-OUT SOOT MODEL

(71) Applicant: GM GLOBAL TECHNOLOGY OPERATIONS LLC, Detroit, MI (US)

(72) Inventors: David E. Edwards, Rochester Hills, MI (US); Giorgio Sticchi, Maglie (IT); Andrea Dutto, Turin (IT); Min Sun, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 16/109,349

(22) Filed: Aug. 22, 2018

(65) Prior Publication Data
US 2020/0063631 A1   Feb. 27, 2020

(51) Int. Cl.
F01N 3/00 (2006.01)
F01N 9/00 (2006.01)
F01N 3/025 (2006.01)
B01D 46/00 (2006.01)

(52) U.S. Cl.
CPC ......... *F01N 9/002* (2013.01); *B01D 46/0063* (2013.01); *F01N 3/0253* (2013.01); *B01D 2279/30* (2013.01); *F01N 2900/08* (2013.01); *F01N 2900/1606* (2013.01)

(58) Field of Classification Search
CPC .... B01D 46/0063; F01N 9/002; F01N 3/0253
USPC .......................................................... 60/274
See application file for complete search history.

(56) References Cited

U.S. PATENT DOCUMENTS

| | | | | |
|---|---|---|---|---|
| 8,561,391 | B2* | 10/2013 | Schumacher | F02D 35/023 60/274 |
| 2007/0227492 | A1* | 10/2007 | Cheiky | G06F 16/583 123/304 |
| 2011/0072783 | A1* | 3/2011 | Hepburn | F01N 3/023 60/274 |
| 2011/0209460 | A1* | 9/2011 | He | F01N 9/002 60/274 |
| 2014/0000239 | A1* | 1/2014 | Swoish | F02D 41/029 60/274 |
| 2014/0069081 | A1* | 3/2014 | Tylutki | F01N 11/002 60/274 |
| 2014/0123608 | A1 | 5/2014 | Sun et al. | |
| 2014/0338434 | A1 | 11/2014 | Sun et al. | |
| 2015/0088399 | A1 | 3/2015 | Sun et al. | |
| 2015/0252699 | A1* | 9/2015 | Catalogna | F01N 3/023 60/274 |
| 2015/0267590 | A1* | 9/2015 | Sun | F01N 11/002 60/274 |
| 2016/0033385 | A1 | 2/2016 | Tylutki et al. | |

(Continued)

*Primary Examiner* — Jason D Shanske
(74) *Attorney, Agent, or Firm* — Cantor Colburn LLP

(57) ABSTRACT

An automotive vehicle includes an internal combustion engine that combusts an air/fuel mixture thereby generating exhaust gas containing particulate matter, and an exhaust after-treatment component that collects the particulate matter. A regeneration system burns off the collected particulate matter thereby regenerating the exhaust after-treatment component. A controller obtains a model of the combustion that is based on a kinetic controlled combustion phase and a mixing controlled combustion phase, and determines a point on the model with respect to current engine conditions that indicates an amount of the particulate matter in the exhaust gas.

20 Claims, 5 Drawing Sheets

(56) References Cited

U.S. PATENT DOCUMENTS

2016/0053648 A1\* 2/2016 Iojoiu .................. F02D 41/029
                                                    60/274

\* cited by examiner

SEMI-EMPIRICAL ENGINE-OUT SOOT MODEL

INTRODUCTION

Various non-limiting embodiments described herein are generally related to automotive vehicles, and more particularly, to exhaust treatment systems.

The emission of particulate matter in exhaust generated by internal combustion engines is regulated for environmental reasons. Thus, vehicles often include after-treatment components such as particulate filters, catalyzed soot filters and adsorption catalysts for removing particulate matter, soot, and other regulated constituents (e.g., nitrogen oxides or NOx) from the exhaust stream.

Back pressure in the exhaust system may increase as the collected particulate matter accumulates in the after-treatment components. Various techniques such as regenerating after-treatment components, for example, have been developed to reduce the back pressure by burning off the accumulated soot or other particular matter. To optimize regeneration timings, engine control systems typically utilize a soot model to deduce (i.e., predict) a mass of soot accumulated in the after-treatment component. In this manner, the engine control system can use the deduced soot mass data to perform various exhaust treatment measures including, but not limited to, monitoring soot loading over time, determining when regeneration may be necessary or desirable, facilitating a regeneration event, and effectuating control over a regeneration process.

SUMMARY

According to a non-limiting embodiment, an automotive vehicle includes an internal combustion engine that combusts an air/fuel mixture thereby generating exhaust gas containing particulate matter, and an exhaust after-treatment component that collects the particulate matter. A regeneration system burns off the collected particulate matter thereby regenerating the exhaust after-treatment component. A controller obtains a model of the combustion that is based on a kinetic controlled combustion phase and a mixing controlled combustion phase, and determines a point on the model with respect to current engine conditions that indicates an amount of the particulate matter in the exhaust gas.

In addition to one or more of the features described herein, the model of the combustion is defined by a plurality of first operating parameters selected from a first parameter group and a plurality of second operating parameter selected from a second parameter group different from the first group.

In addition to one or more of the features described herein, each second operating parameter is a cross-term defined as a combination of at least two of the first operating parameters included in the first parameter group.

In addition to one or more of the features described herein, the first operating parameters of the first parameter group include rail pressure (RP), exhaust gas recirculation flow rate (EGR); equivalence air-fuel ratio (EQR); and start of injection angle of the main injection pulse (SOI).

In addition to one or more of the features described herein, the second operating parameters include a product of EQR and SOI (EQR*SOI), a squared value of EGR ($EGR^2$), a product of EGR and SOI (EGR*SOI), a squared value of EGR ($EGR^2$), a product of RP and EQR (RP*EQR), a product of RP and SOI (RP*SOI), and a squared value of SOI ($SOI^2$).

In addition to one or more of the features described herein, the model of the combustion is based on a function of the first and second operating parameters, the function defined as:

$$f(\Sigma a_i x_i + \Sigma b_j x_i x_j + c), \text{ where}$$

$x_i$ is each first operating parameter among the plurality of first operating parameters;

$a_i$ is a first lookup table coefficient corresponding to a given first operating parameter among the first operating parameters;

$x_i x_j$ is each cross-term among the plurality of second operating parameters;

$b_i$ is a second lookup table coefficient corresponding to a given second operating parameter among the plurality of second operating parameters; and c is a combustion mode coefficient corresponding to a current combustion mode of the engine.

In addition to one or more of the features described herein, the combination of the first lookup table coefficient and a given first operating parameter ($a_i x_i$) defines a first-order parameter indicating an effect the first operating parameter ($x_i$) has on a production of the particulate matter.

In addition to one or more of the features described herein, the combination of the second lookup table coefficient and a given cross-term ($b_i x_i x_j$) defines a second-order parameter indicating an effect the cross-term ($x_i x_j$) has on the production of the particulate matter.

In addition to one or more of the features described herein, the particulate matter includes soot, and the exhaust after-treatment component includes a particulate filter disposed downstream from the internal combustion engine.

In addition to one or more of the features described herein, the controller controls a timing at which to activate the regeneration system and regenerate the exhaust after-treatment component based on the amount of the particulate matter in the exhaust gas.

According to another non-limiting embodiment, a method is provided to determine an amount of particulate matter in exhaust gas output from an internal combustion engine. The method includes performing, via an internal combustion engine, combustion of an air/fuel mixture to generate the exhaust gas, and collecting, via an exhaust after-treatment component, particulate matter contained in the exhaust gas. The method further includes obtaining, via a controller, a model of the combustion that is based on a kinetic controlled combustion phase and a mixing controlled combustion phase. The method further includes determining, via the controller, a point on the model with respect to current engine conditions that indicates an amount of the particulate matter in the exhaust gas. The method further includes initiating a regeneration process, via a regeneration system, based on the indicated amount of particulate matter in the exhaust gas to burn off the collected particulate matter and regenerate the after-treatment component.

In addition to one or more of the features described herein, the method further includes defining the model of the combustion based on a plurality of first operating parameters selected from a first parameter group and a plurality of second operating parameter selected from a second parameter group different from the first group.

In addition to one or more of the features described herein, method further includes determining each second operating parameter as a cross-term that is based on a combination of at least two of the first operating parameters included in the first parameter group.

In addition to one or more of the features described herein, the first operating parameters included in the first parameter group includes rail pressure (RP), exhaust gas recirculation flow rate (EGR); equivalence air-fuel ratio (EQR); and start of injection angle of the main injection pulse (SOI).

In addition to one or more of the features described herein, the second operating parameters include a product of EQR and SOI (EQR*SOI), a squared value of EGR (EGR$^2$), a product of EGR and SOI (EGR*SOI), a squared value of EGR (EGR$^2$), a product of RP and EQR (RP*EQR), a product of RP and SOI (RP*SOI), and a squared value of SOI (SOI$^2$).

In addition to one or more of the features described herein, the model of the combustion is based on a function of the first and second operating parameters, the function defined as:

$$f(\Sigma a_i x_i + \Sigma b_i x_i x_j + c), \text{ where}$$

$x_i$ is each first operating parameter among the plurality of first operating parameters;

$a_i$ is a first lookup table coefficient corresponding to a given first operating parameter among the first operating parameters;

$x_i x_j$ is each cross-term among the plurality of second operating parameters;

$b_i$ is a second lookup table coefficient corresponding to a given second operating parameter among the plurality of second operating parameters; and $c$ is a combustion mode coefficient corresponding to a current combustion mode of the engine.

In addition to one or more of the features described herein, the combination of the first lookup table coefficient and a given first operating parameter ($a_i x_i$) defines a first-order parameter indicating an effect the first operating parameter ($x_i$) has on a production of the particulate matter.

In addition to one or more of the features described herein, the combination of the second lookup table coefficient and a given cross-term ($b_i x_i x_j$) defines a second-order parameter indicating an effect the cross-term ($x_i x_j$) has on the production of the particulate matter.

In addition to one or more of the features described herein, the particulate matter includes soot, and the exhaust after-treatment component includes a particulate filter disposed downstream from the internal combustion engine.

In addition to one or more of the features described herein, method further includes controlling, via the controller, a timing at which to initiate the regeneration system and regenerate the exhaust after-treatment component based on the indicated amount of particulate matter in the exhaust gas.

The above features and advantages and other features and advantages of the present teachings are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
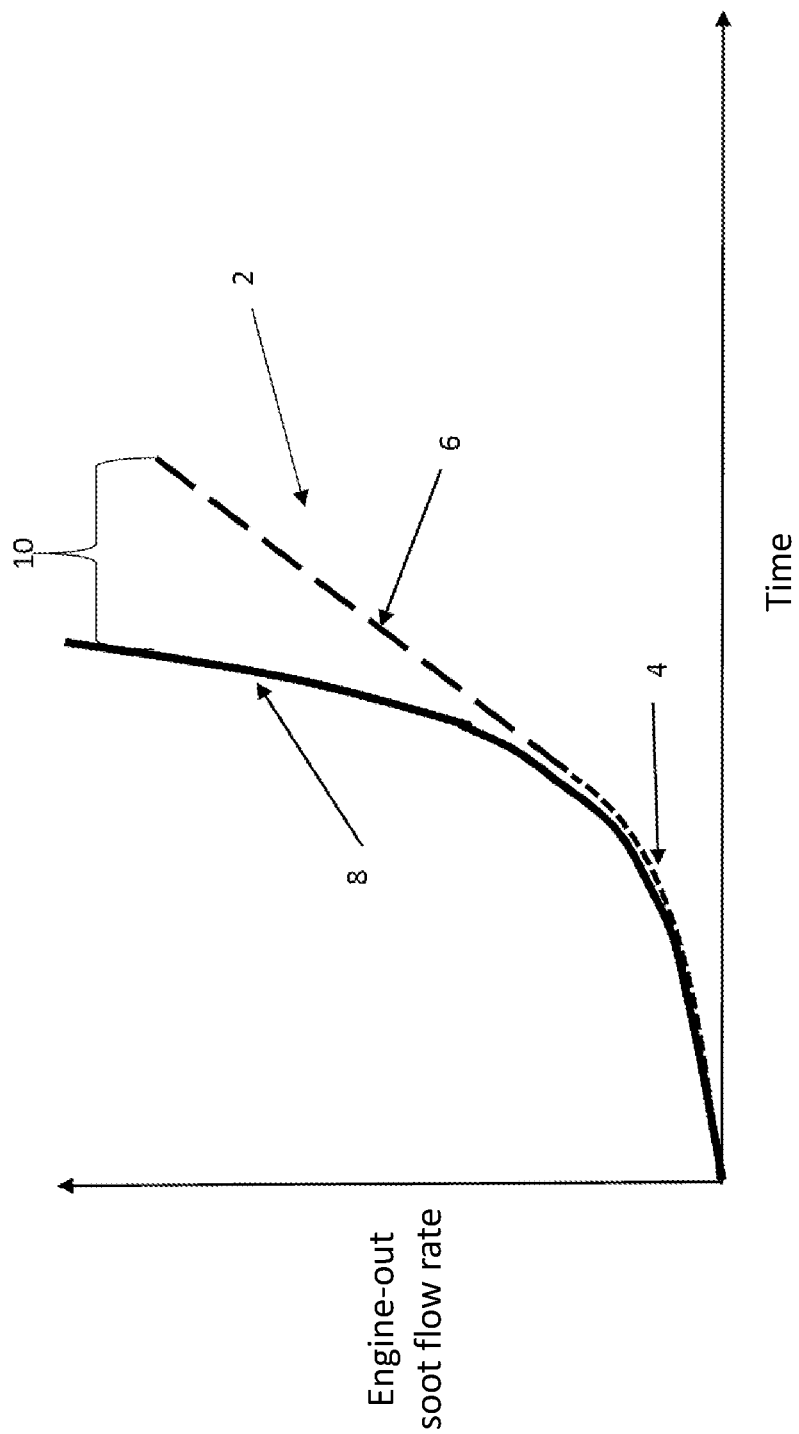
FIG. 1 is a diagram comparing engine-out soot predicted according to a conventional engine-out soot model versus actual engine-out soot produced according to kinetic controlled combustion and mixing controlled combustion phases.

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Engine combustion in a compression engine (e.g., diesel engines), for example, can be controlled according to a two-phase process. Referring to FIG. 1, a first plot 2 illustrates the two-phase combustion phenomenon. A first phase referred to as a "kinetic controlled combustion" phase occurs when fuel is initially injected into the cylinder and begins to burn. In this phase, combustion can be controlled based on the timing and amount of fuel injected into the cylinders. Although injected fuel self-ignites and begins burning during this phase, air mixture is required to achieve proper fuel combustion. Thus, the combustion can further be controlled using a second phase referred to as a "mixing controlled combustion" phase, which controls the mixture of air and fuel in the cylinder.

Fuel burning during kinetic controlled combustion occurs very rapidly. Therefore, the combustion during this phase can be modeled according to an exponential behavior illustrated at portion 4. However, the mixture of air and fuel occurs much more slowly and therefore can be analyzed according to a liner behavior illustrated at portion 6. Engine-out soot can therefore be viewed as being produced during two phases of engine combustion.

Engine-out models currently implemented in engine control systems operate according to a non-linear function, illustrated as plot 8 in FIG. 1. In other words, current engine-out models are designed under a presumption that engine-out soot follows only the exponential behavior of the kinetic controlled combustion phase. Therefore, the current engine-out models are inaccurate and are incapable of distinguishing soot output during the exponential kinetic controlled combustion phase versus soot output during the mixing controlled combustion phase. This produces an error 10 between the current engine-out soot model 8 and the actual two-phase combustion phenomenon 2, which contributes to inaccurate soot predictions that lead to inefficient operation of a vehicle's exhaust gas treatment system.

Moreover, current engine-out models lack flexibility and cannot adapt to the implementation of additional model parameters. For instance, current non-linear engine-out models are incapable of directly calculating a predicted amount of soot using model parameters. Instead, a limited number of parameters must be normalized across a set number key points, and the results must then be subsequently un-normalized to determine a predicted soot value at each key point. Therefore, current engine-out models require complex model structures and excessive computational processing.

Various non-limiting embodiments described herein provide an engine control system that implements a semi-empirical engine-out soot model capable of interpolating an increased number of input model parameters. In at least one non-limiting embodiment, the semi-empirical engine-out soot model incorporates a linear function that takes into account the effect the mixing controlled combustion has on the overall amount of soot exhausted from the engine. In this manner, a more accurate prediction of the engine-out soot is determined, which in turn allows for improved soot loading prediction and regeneration timings.

Figure 2:
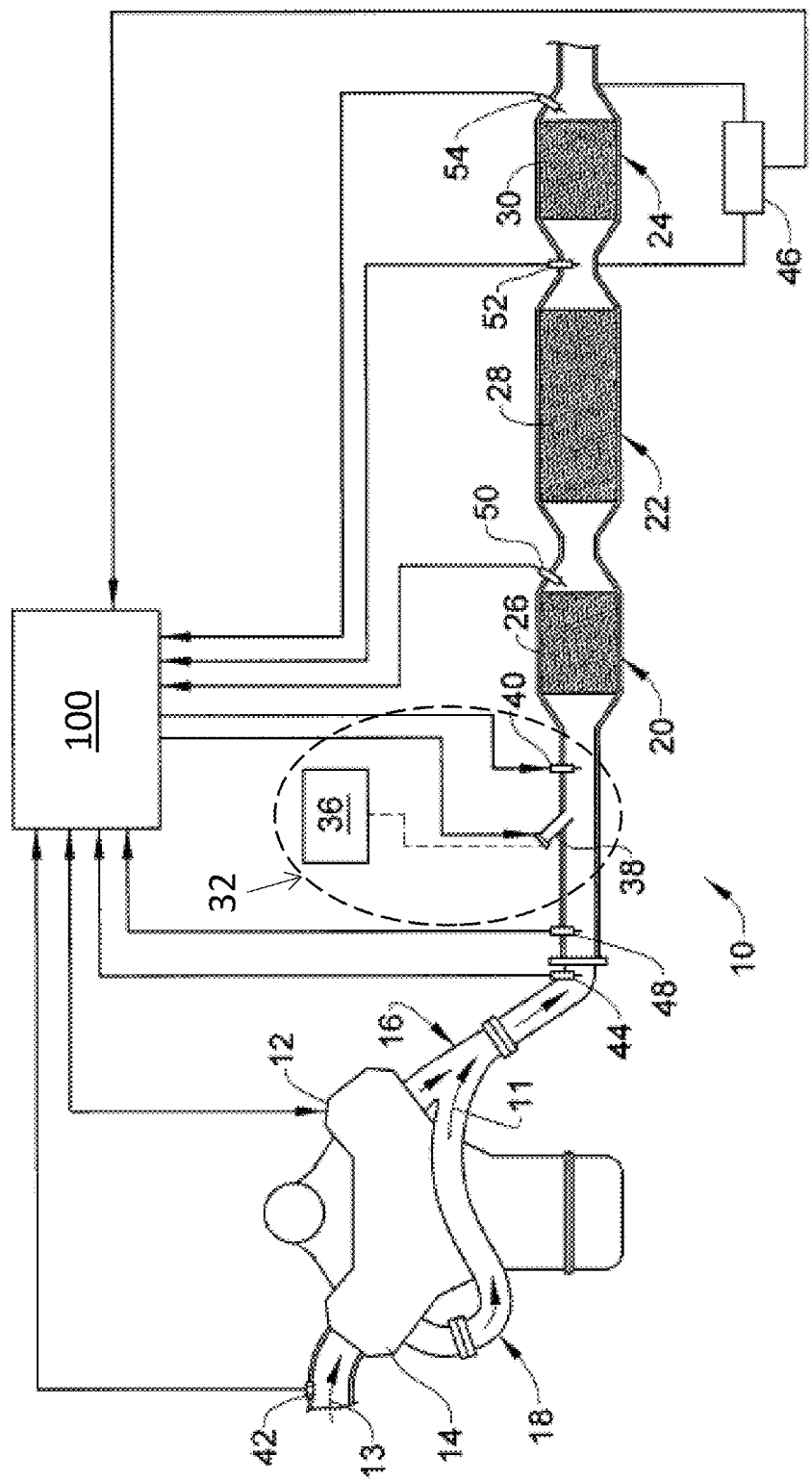
FIG. 2 is a functional block diagram of a vehicle including an exhaust treatment system according to a non-limiting embodiment.

Referring now to FIG. 2, exemplary embodiments of the present disclosure are directed to an exhaust treatment system 10 that reduces exhaust gas constituents present in exhaust gas 11 generated by an internal combustion engine 12. It is appreciated that the exhaust treatment system 10 described herein may be utilized with various engine systems that may include, for example, but are not limited to, diesel engines, gasoline direct injection systems and homogeneous charge compression ignition engine systems.

Air 13 is drawn into cylinders 14 of the engine 12 and mixed with fuel. The air/fuel mixture is combusted therein and expelled through an exhaust system 16. As described herein, the air/fuel combustion can be viewed as including two phases: a mixing controlled combustion phase and a kinetic controlled combustion phase. In one or more embodiments, the engine can operate in different combustion modes to combust the air/fuel mixture. For example, the engine can operate in a first combustion mode upon cold-start of the engine, and a different second combustion mode during a cruising condition. As can be appreciated, the systems and methods of the present disclosure can be implemented in engines having a plurality of cylinders 14 including, but not limited to, 2, 3, 4, 5, 6, 8, 10 and 12 cylinders.

An electronic hardware controller 100 is configured to control the engine 12 and/or exhaust treatment system 10 based on various operating parameters and coefficient look-up tables (LUTs). The operating parameters include, but are not limited to, engine revolutions per minute (RPM), engine fuel consumption, engine torque, intake manifold temperature, intake manifold pressure, air-fuel ratio, exhaust gas recirculation (EGR) rate, start of injection (SOI) time, rail pressure (RP), engine coolant temperature, outside air temperature, outside air pressure, swirl position, pilot quantities, injection pressure, and dwell periods. The operating parameters can also be calculated by the controller 100 using various models stored in memory and/or can be obtained by one or more sensors installed on the vehicle as understood by one of ordinary skill in the art. The controller 100 is also capable of calculating additional cross-term parameters including, but not limited to, an equivalent ratio (EQR), the product of EQR and SOI (EQR*SOI), the product of RP and EQR (RP*EQR), and the product of RP and SOI (RP*SOI). The coefficient LUTs are stored in the controller memory.

The exhaust treatment system 10 is in fluid communication with the exhaust system 16 to receive the exhaust gas 11. The exhaust treatment system 10 generally includes one or more exhaust conduits 18, and one or more exhaust treatment devices. In various embodiments, the exhaust treatment devices include an oxidation catalyst device (OC) 20, a selective catalytic reduction device (SCR) 22, and a particulate filter (PF) 24.

Still referring to FIG. 2, the exhaust conduit 18, which may comprise several segments, transports exhaust gas 11 from the engine 12 to the exhaust gas treatment devices. For example, the OC 20 receives exhaust gas 11 from the engine 12. As can be appreciated, the OC 20 can be of various flow-through, oxidation catalysts as understood by one of ordinary skill in the art. In various embodiments the OC 20 may include a flow-through metal or ceramic monolith OC substrate 26 that is packaged in a rigid shell or canister having an inlet and an outlet in fluid communication with the exhaust conduit 18. The OC substrate 26 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 20 treats unburned gaseous and non-volatile HC and CO, which are oxidized to form carbon dioxide and water. The OC 20 may also generate $NO_2$ to assist in converting $NO_x$ via the SCR 22 as discussed in greater detail. Further, the OC 22 may generate an exothermic event (e.g., a temperature increase) to heat the exhaust gas 11 to a regeneration temperature that regenerates the PF 24, as discussed in greater detail below.

The SCR 22 may be disposed downstream of the OC 20, and is configured to reduce $NO_x$ constituents in the exhaust gas 11. In at least one embodiment, the SCR 22 may also be configured to filter the exhaust gas 11 of carbon and other particulate matter. As can be appreciated, the SCR 22 may be constructed of various materials understood by one of ordinary skill in the art. In various embodiments, for example, the SCR 22 may be constructed using a wall flow monolith SCR filter 28, such as, for example, wound or packed fiber filters, open cell foams, sintered metal fibers, etc. In various embodiments, the SCR 22 includes an SCR catalyst composition (e.g., a SCR washcoat) applied to the SCR filter 28. The SCR 22 may utilize a reductant, such as ammonia ($NH_3$) to reduce the NOR. More specifically, the SCR 22 catalyst composition can contain a zeolite and one or more base metal components such as iron (Fe), cobalt (Co), copper (Cu) or vanadium (V) which can operate efficiently to convert NOR constituents in the exhaust gas 11 in the presence of $NH_3$. The reductant utilized by the SCR 22 may be in the form of a gas, a liquid, or an aqueous urea solution and may be mixed with air 13 to aid in the dispersion of an injected spray generated by a reductant supply system as understood by one of ordinary skill in the art.

The PF 24 may be disposed downstream of the SCR 22. Likewise, the PF 24 receives the exhaust gas 11 from the engine 12. The PF 24 includes a filter substrate 30 configured to filter the exhaust gas 11 of carbon and other particulate matter (e.g., soot). As can be appreciated, the PF 24 can be of various particulate filters as understood by one of ordinary skill in the art. In various embodiments, the PF 24 may be constructed using a wall flow monolith filter substrate 30 or other devices, such as, for example, wound or packed fiber filters, open cell foams, sintered metal fibers, etc. Trapped particulate matter (i.e., soot stored in the filter substrate 30) is removed from the PF 24 through one or more regeneration operations as understood by one of ordinary skill in the art. In at least one embodiment, the PF 24 may be regenerated using an active regeneration operation as discussed in greater detail below.

The exhaust treatment system further includes a regeneration system 32 disposed upstream from the OC 20. The regeneration system 32 includes a fuel supply 36, an injector 38, and an igniter 40. The fuel supply 36 stores fuel (e.g., hydrocarbon fuel). In another embodiment, the igniter 40 may be removed, and the engine 12 may be controlled to increase the temperature of the exhaust gas 11. The increased exhaust gas temperatures reaches a PF combustion temperature that initiates combustion of the particulate matter and soot stored in the PF 24, as understood by those ordinarily skilled in the art.

The controller 100 is in electrical communication with the injector 38 and the igniter 40. The controller 100 controls the injector 38 to inject an amount of fuel into the exhaust gas 11 and to control the timing of the igniter 40 to ignite the fuel. In response to igniting the fuel, the hydrocarbon fuel mixed with the exhaust gas 11 is oxidized in the OC 20 causing an exothermic reaction that raises the temperature of the exhaust gas 11. The heated exhaust gas 11 travels downstream to the PF 24, which heats the filter substrate 30. The increased heat causes the soot stored in the filter substrate 30 to ignite and burn as the exhaust gas 11 passes through the PF 24, thereby regenerating the PF 24.

The controller 100 may control the regeneration system 32 based on one or more operating conditions and/or data models. For example, the regeneration system 32 may determine a traveling distance of a vehicle, and initiate the regeneration operation when the vehicle travels a predetermined distance. In another embodiment, the controller 100 may measure an amount of particulate matter (e.g., soot mass) stored in the PF 24 and may initiate the regeneration operation when the soot mass exceeds a threshold. In another embodiment, the regeneration may be initiated based on time (e.g., operating time of the engine 12) and/or fuel injection (e.g., the amount of fuel injected in one or more of the cylinders 14).

The operating conditions may be measured by one or more sensors. Referring to FIG. 2, the exhaust treatment system 10 may include a mass air flow (MAF) sensor 42 and a $NO_x$ sensor 44. The MAF sensor 42 determines an intake air mass ($m_{Air}$) of the engine 10. In one embodiment, the MAF sensor 42 may include either a vane meter or a hot wire type intake mass air flow sensor. However, it is appreciated that other types of sensors may be used as well. The $NO_x$ sensor 44 is disposed upstream from the OC 20 and determines an amount of $NO_x$ (e.g. $NOx_{MASS}$) present in the exhaust gas 18 and/or a $NO_x$ flow rate (e.g., $NO_{xRATE}$).

The exhaust treatment system 10 may further include at least one pressure sensor 46 (e.g., a delta pressure sensor), as illustrated in FIG. 2. The delta pressure sensor 46 may determine the pressure differential (i.e., Δp) between an inlet and an outlet of the PF 24. Although a single delta pressure sensor 46 is illustrated, it is appreciated that a plurality of pressure sensors may be used to determine the pressure differential of the PF 24 as understood by one of ordinary skill in the art.

In addition to various pressure sensors, the exhaust treatment system 10 may include one or more temperature sensors. According to at least one exemplary embodiment of the present disclosure illustrated in FIG. 2, the exhaust treatment system 10 may include temperature sensors 48, 50, 52, 54. The number of temperature sensors illustrated in FIG. 2, however, is not limited thereto. A first temperature sensor 48 is disposed upstream from the injector 38 to determine the temperature of the exhaust gas 11 entering the exhaust treatment system 10. A second temperature sensor 50 is disposed at an outlet of the OC 20 to determine an OC outlet temperature. A third temperature sensor 52 is interposed between the SCR 22 and the PF 24, and a fourth temperature sensor 54 is disposed at the outlet of the PF 24. The second temperature sensor 50 and the third temperature sensor 52 may determine the temperature of the SCR 22. The third temperatures sensor 52 and the fourth temperature sensor 54 may determine the temperature of the PF 24 as understood by one of ordinary skill in the art.

In at least one exemplary embodiment of the disclosure, the regeneration system 32 may electrically communicate with an externally connected diagnostic module (not shown), which outputs one or more diagnostic control signals. In response to receiving the diagnostic control signal, the controller 100 may initiate the regeneration operation discussed above. In at least one embodiment, the regeneration system 32 may over-ride one or more regeneration conditions that control the regeneration operation. That is, the controller 100 may initiate the regeneration operation in response to the diagnostic control signal, regardless of one or more regeneration conditions. The regeneration conditions include, but are not limited to, engine operating time, driving distance, soot mass, and regeneration frequency, any of which initiate the regeneration operation. The regeneration frequency condition is based on a regeneration history of the PF 24. For example, the regeneration frequency may be based on a comparison between number of executed regeneration operations and a frequency threshold. Therefore, the over-ride signal may initiate a regeneration operation regardless of the number of times the PF 24 has been previously regenerated.

Figure 3:
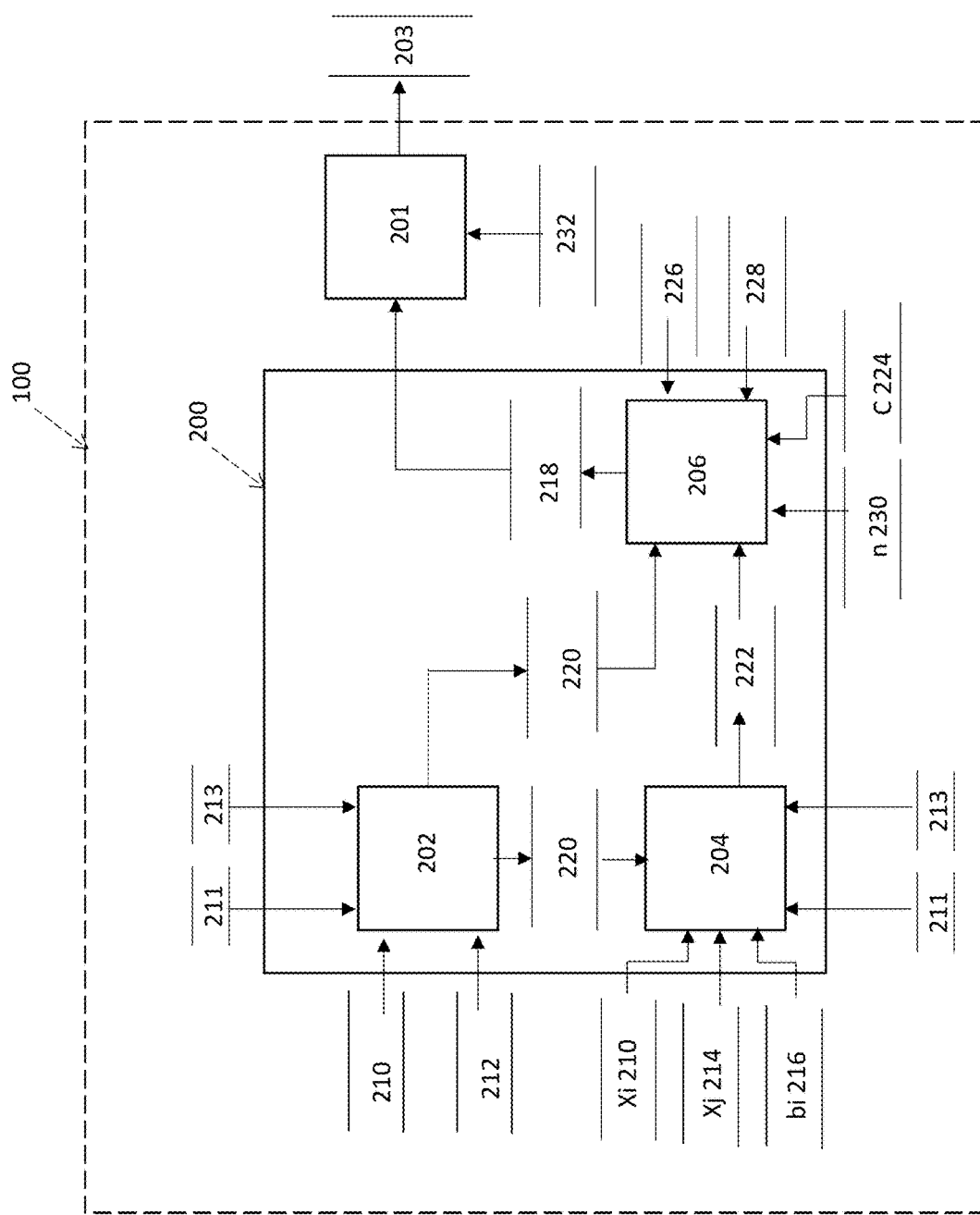
FIG. 3 is a dataflow diagram illustrating a control system of the exhaust treatment system according to a non-limiting embodiment.

Referring now to FIG. 3, a diagram illustrating dataflow associated with a soot ratio controller 200 included in controller 100 is illustrated according to a non-limiting embodiment. The soot ratio controller 200 is in signal communication with a regeneration controller 201 and is configured to generate a semi-empirical engine-out soot model capable of predicting engine-out soot flow rate of soot that is delivered to the exhaust treatment system 10 (see FIG. 2). Based on the predicted engine-out soot flow rate, the regeneration controller 201 can determine a regeneration timing and generate a control signal 203 that controls the regeneration system 32 (see FIG. 2).

Various embodiments of the controller 100 may include any number of sub-modules. As can be appreciated, the sub-modules shown in FIG. 3 may be combined and/or further partitioned to model engine-out soot flow rate. Inputs to the controller 100 may be provided by various vehicle sensors (not shown in FIG. 3), received from other control modules (not shown in FIG. 3), and/or determined or modeled by the controller 100.

In various embodiments, the soot ratio controller 200 includes a first-order parameter controller 202, a second-order parameter controller 204, and an engine-out soot controller 206. Any one of the soot ratio controller 200, the regeneration controller 201, the first-order parameter controller 202, the second-order parameter controller 204, and the engine-out soot controller 206 can be constructed as an electronic hardware controller that includes memory and a processor configured to execute algorithms and computer-readable program instructions stored in the memory.

The first-order parameter controller 202 determines first-order parameters ($a_i x_i$) of the predicted engine-out soot as a function of the current engine speed (RPM) and current engine fuel consumption (fuel) of the vehicle. For instance, the first-order parameter controller 202 receives a first operating parameter ($x_i$) 210 and a first LUT coefficient ($a_i$) 212. The first operating parameter ($x_i$) 210 can be provided by one or more sensors and/or another data device such as a sub-controller. In at least one embodiment, the first operating parameter ($x_i$) 210 is selected from a group that includes, for example, rail pressure (RP) or injection pressure, start of injection angle of the main injection pulse (SOI), intake manifold temperature, intake manifold pressure, exhaust gas recirculation flow rate (EGR), equivalence air-fuel ratio (EQR), engine coolant temperature, outside air temperature, outside air pressure, swirl position, pilot injection quantity and dwell time, main injection quantity and dwell time, after pulse quantities and dwell times, and low pressure EGR split measurements.

The first LUT coefficient ($a_i$) 212 is defined by a LUT, and corresponds to the first operating parameter ($x_i$) 210. Both the first LUT coefficient ($a_i$) 212 and the first operating parameter ($x_i$) 210 are input to the first-order parameter controller 202. The value of the first LUT coefficient ($a_i$) 212 is selected from a LUT that is defined as a function of the current engine speed (RPM) parameter 211 and current engine fuel consumption parameter 213. Accordingly, the combination of each first operating parameter ($x_i$) 210 and its corresponding first LUT coefficient ($a_i$) 212 defines a first-order parameter ($a_i x_i$) that indicates the individual contribution (e.g., linear correlation) of a given first operating parameter ($x_i$) 210 to the air/fuel combustion at the current engine speed 211 and current engine fuel consumption 213. The current engine speed parameter 211 and current engine fuel consumption parameter 213 can be obtained using sensors installed on the vehicle and/or calculated by one or more controllers installed on the vehicle.

The second-order parameter controller 204 determines second-order parameters ($b_i x_i x_j$) of the predicted engine-out soot as a function of the current engine speed (RPM) and the current engine fuel consumption (fuel) of the vehicle. For instance, the second-order parameter controller 204 receives the first operating parameter ($x_i$) 210, a second operating parameter ($x_j$) 214, and a cross-term LUT coefficient ($b_i$) 216. The second operating parameter ($x_j$) 214 can be obtained from one or more sensors and/or another data device such as a sub-controller. The second operating parameter ($x_j$) 214 can be the same operating parameter input to the first-order parameter controller 202 or can be a different operating parameter selected from the parameters described herein, e.g., rail pressure (RP) or injection pressure, start of injection angle of the main injection pulse (SOI), intake manifold temperature, intake manifold pressure, exhaust gas recirculation flow rate (EGR), equivalence air-fuel ratio (EQR), engine coolant temperature, outside air temperature, outside air pressure, swirl position, pilot injection quantity and dwell time, main injection quantity and dwell time, after pulse quantities and dwell times, and low pressure EGR split measurements.

The first operating parameter ($x_i$) 210 and the second operating parameter ($x_j$) 214 can be utilized together to generate "$x_i x_j$", which is referred to herein as a "cross-term." Various cross-terms utilized by the second-order parameter controller 204 include, but are not limited to, a product of EQR and SOI (EQR*SOI), a squared value of EGR ($EGR^2$), a product of EGR and SOI (EGR*SOI), a squared value of EGR ($EGR^2$), a product of RP and EQR (RP*EQR), a product of RP and SOI (RP*SOI), and a squared value of SOI ($SOI^2$).

Each cross-term (i.e., $x_i x_j$) is associated with a respective second LUT coefficient, i.e., a cross-term LUT coefficient ($b_i$) 216, which is different from the first LUT coefficient (ad 212. The value of the cross-term LUT coefficient (bi) 216 is also selected from a LUT that is defined as a function of the current engine speed (RPM) parameter 211 and current engine fuel consumption parameter 213. Accordingly, the combination of each cross-term ($x_i x_j$) and its corresponding cross-term LUT coefficient ($b_i$) 216 defines a second-order parameter ($b_i x_i x_j$) that indicates the individual contribution (e.g., exponential correlation) of a given cross-term ($x_i x_j$) 216 to the air/fuel combustion at the current engine speed 211 and current engine fuel consumption 213.

The engine-out soot controller 206 is configured to calculate a soot ratio ($soot_{RATIO}$), i.e., the predicted engine-out soot 218 output from the engine. The predicted engine-out soot 218 effectively defines a predicted soot model and determines a point on the model with respect to the current engine conditions (e.g., current RPM and fuel) that indicates an amount of the particulate matter (e.g., soot) in the exhaust gas output from the engine.

The $soot_{RATIO}$ value is based on the equivalence air-fuel ratio (EQR) as a function of the first-order parameters ($a_i x_i$), i.e., output 220 and second-order parameters ($b_i x_i x_j$), i.e., output 222, generated by the first-order parameter controller 202 and the second-order parameter controller 204, respectively. In one or more embodiments, the engine-out soot controller 206 can input a combustion mode coefficient (c) 224 to improve the accuracy of the predicted engine-out soot 218. Accordingly, the predicted engine-out soot 218 can be expressed as:

$$Soot_{RATIO} = EQR^n f(\Sigma a_i x_i + \Sigma b_i x_i x_j + c), \text{ where}$$

EQR is the equivalence air-fuel ratio;

n is a power factor indicating an average relationship between soot and the EQR;

$x_i$ is each first operating parameter among the plurality of first operating parameters;

$a_i$ is a first lookup table coefficient corresponding to a given first operating parameter among the first operating parameters;

$x_i x_j$ is each second operating parameter among the plurality of second operating parameters;

$b_i$ is a second lookup table coefficient corresponding to a given second operating parameter among the plurality of second operating parameters; and c is the combustion mode coefficient corresponding to a current combustion mode of the engine.

The power factor (n) 230 can include a constant derived from empirical data or can be determined dynamically as a function of a current operating parameter. In at least one embodiment, the power factor (n) 230 can be a scalar value indicating the average relationship between soot and EQR. The engine-out soot controller 206 can also receive as inputs the actual air-fuel ratio ($AFR_{ACTUAL}$) 226 and the ideal/stoichiometric air-fuel ratio ($AFR_{IDEAL}$) 228. Accordingly, the engine-out soot controller 206 can calculate the EQR as a ratio between the actual air-fuel ratio 226 and the ideal/stoichiometric air-fuel ratio 228, or:

$$EQR = AFR_{IDEAL}/AFR_{ACTUAL}$$

As described herein, the soot ratio controller 200 can output the engine-out soot flow rate prediction value 218 by calculating EQR as a function of the outputs 220 and 222, generated by the first-order parameter controller 202 and the second-order parameter controller 204. During testing, it was found that the effects of EQR contributed significantly to engine-out soot production. It should be appreciated, however, that the function of the first-order parameters and the second-order parameters (i.e., $f(\Sigma a_i x_i + \Sigma b_i x_i x_j + c)$, may be utilized with parameters different from EQR that also effect engine-out soot production without departing from the scope of the present teachings. In any case, the engine-out soot flow model module 200 provides a more accurate prediction of the level of soot produced during both the kinetic controlled combustion phase and the mixing controlled combustion phase of the air/fuel combustion during the current operating conditions of the vehicle, e.g., at the current engine speed and current fuel consumption. As a result, the accuracy of the overall engine-out soot predictions is increased. The increased accuracy of the engine-out soot prediction can then be utilized by the regeneration system 32 to optimize regeneration timing.

The regeneration controller 201 receives the predicted engine-out soot 218 from the engine-out soot controller 206, along with one or more exhaust system parameters 232. The exhaust system parameters 232 may include sensed or derived parameters, such as $NOx_{MASS}$, $NOx_{RATE}$, $\Delta p$, oxygen level, particulate filter inlet temperature, and an exhaust mass flow rate. Based on the predicted engine-out soot prediction 218 and the exhaust system parameters 232, the regeneration controller 201 calculates a particulate filter soot loading prediction.

Once determining the soot loading prediction, the regeneration controller 201 further determines regeneration timing of an after-treatment component such as the PF 24 (see FIG. 2). For example, if the soot loading prediction indicates that regeneration of the PF 24 is needed, the regeneration controller 201 generates one or more control signals 203 to the engine 12 and/or the regeneration system 32. In various embodiments, regeneration may be needed, for example, after a certain time of engine operation has elapsed, or when engine operating conditions create certain exhaust flow characteristics that create excessive soot. Accordingly, the regeneration controller 201 may optimize the regeneration timing according to the soot loading prediction, which is ultimately based on the predicted engine-out soot 218. Therefore, because the accuracy of the predicted engine-out soot 218 is increased, the regeneration timing is improved.

Figure 4A:
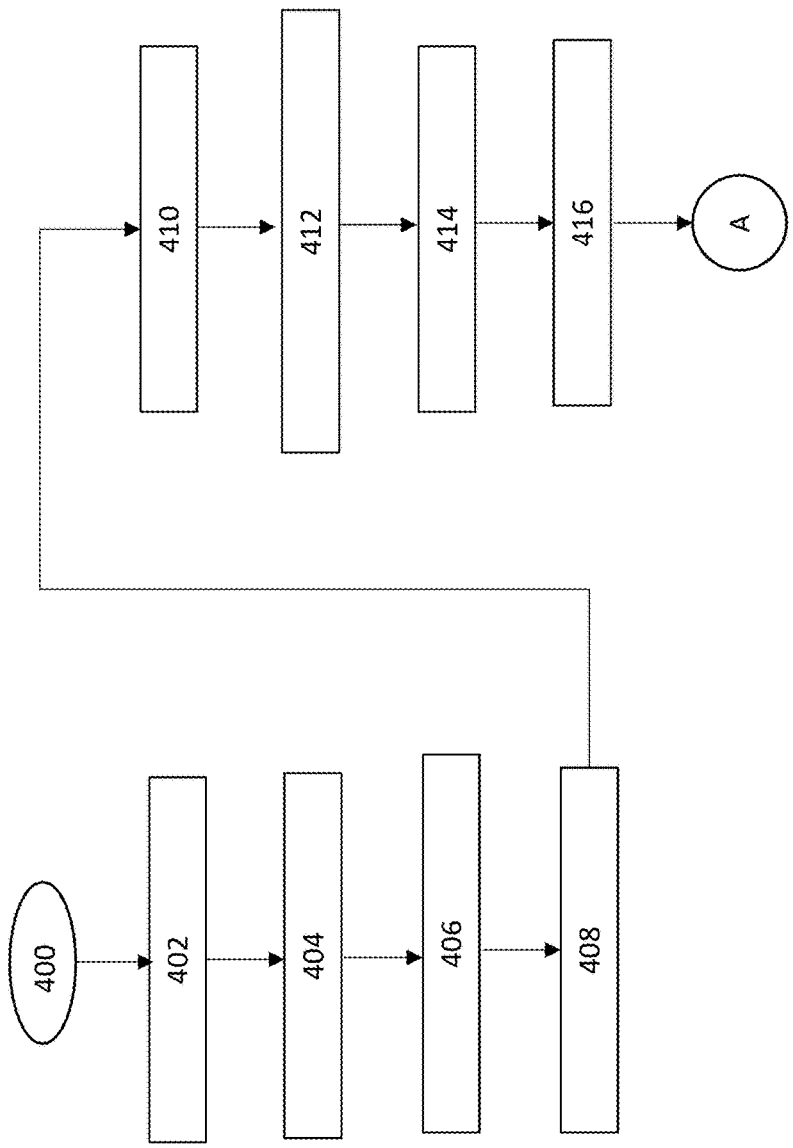
FIGS. 4A and 4B is a flowchart illustrating a method of predicting the engine-out soot in an exhaust treatment system according to a non-limiting embodiment.
Figure 4B:
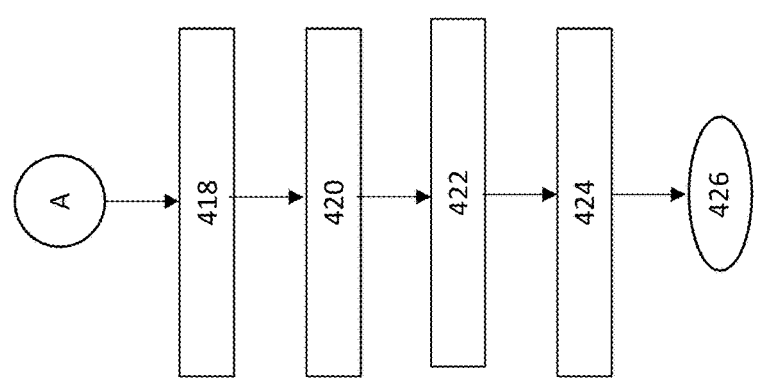

Turning now to FIGS. 4A and 4B, a method of predicting the engine-out soot in an exhaust treatment system is illustrated according to a non-limiting embodiment. The method begins at operation 400, and at operation 402 the current engine speed (RPM) and the current engine fuel consumption (fuel) is determined. At operation 404, first operating parameters ($x_i$) are determined. At operation 406, first LUT coefficients ($a_i$) are determined as a function of the current RPM and current fuel for each respective first operating parameter ($x_i$). At operation 408, first-order parameters ($a_i x_i$) are determined by multiplying a given first operating parameter ($x_i$) with its corresponding LUT coefficient ($a_i$). In at least one embodiment, each first-order parameter ($a_i x_i$) may express a linear correlation indicating the effect a given first operating parameter ($x_i$) has on soot production at the current engine speed and the current engine fuel consumption.

At operation 410, second operating parameters ($x_1$) are determined. At operation 412, a set of cross-terms ($x_i x_j$) is determined based on the first operating parameters ($x_i$) and the second operating parameters ($x_j$). At operation 414, second LUT coefficients, i.e., cross-term LUT coefficients ($b_i$) are determined for each respective cross-term ($x_i x_j$). At operation 416, second-order parameters ($b_i x_i x_j$) are determined by multiplying a given cross-term ($x_i x_j$) with its corresponding LUT coefficient ($b_i$). In at least one embodiment, the second-order parameter ($b_i x_i x_j$) may indicate the combined effect a given cross-term ($x_i x_j$) has on soot production at the current engine speed and the current engine fuel consumption.

Turning to operation 418 (see FIG. 4B), the actual air-fuel ratio ($AFR_{IDEAL}$) and the ideal/stoichiometric air-fuel ratio ($AFR_{ACTUAL}$) are determined. Accordingly, the equivalence air-fuel ratio (EQR) is determined at operation 420. The EQR can be determined, for example, as a ratio between the ideal/stoichiometric air-fuel ratio ($AFR_{IDEAL}$) and the actual air-fuel ratio ($AFR_{ACTUAL}$). At operation 422, the engine-out soot is determined based on the EQR, a summation of the first-order parameters ($a_i x_i$) and a summation of the second-order parameters ($b_i x_i x_j$). In at least one embodiment, a combustion mode coefficient (c) can be utilized to further refine the determined engine-out soot. At operation 424, an after-treatment component is regenerated based on the determined engine-out soot, and the method ends at operation 426.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An automotive vehicle comprising:
    an internal combustion engine configured to perform combustion of an air/fuel mixture thereby generating exhaust gas containing particulate matter;
    an exhaust after-treatment component configured to collect the particulate matter;
    a regeneration system configured to regenerate the exhaust after-treatment component by burning off the collected particulate matter; and
    a controller configured to obtain a model of the combustion based on a kinetic controlled combustion phase and a mixing controlled combustion phase, and to determine a point on the model with respect to current engine conditions indicating an amount of the particulate matter in the exhaust gas.

2. The vehicle of claim 1, wherein the model of the combustion is defined by a plurality of first operating parameters selected from a first parameter group and a plurality of second operating parameters selected from a second parameter group different from the first group.

3. The vehicle of claim 2, wherein at least one of the second operating parameters is a cross-term defined as a combination of at least two of the first operating parameters included in the first parameter group.

4. The vehicle of claim 3, wherein the first operating parameters included in the first parameter group comprise rail pressure (RP), exhaust gas recirculation flow rate (EGR); equivalence air-fuel ratio (EQR); and start of injection angle of the main injection pulse (SOI).

5. The vehicle of claim 4, wherein the second operating parameters comprise a product of EQR and SOI (EQR*SOI), a squared value of EGR ($EGR^2$), a product of EGR and SOI (EGR*SOI), a product of RP and EQR (RP*EQR), a product of RP and SOI (RP*SOI), and a squared value of SOI ($SOI^2$).

6. The vehicle of claim 5, wherein the model of the combustion is based on a function of the first and second operating parameters, the function defined as:

$$f(\Sigma a_i x_i + \Sigma b_j x_i x_j + c), \text{ where}$$

x$_i$ is each first operating parameter among the plurality of first operating parameters;

a$_i$ is a first lookup table coefficient corresponding to a given first operating parameter among the first operating parameters;

x$_i$x$_j$ is each cross-term among the plurality of second operating parameters;

b$_i$ is a second lookup table coefficient corresponding to a given second operating parameter among the plurality of second operating parameters; and c is a combustion mode coefficient corresponding to a current combustion mode of the internal combustion engine.

7. The vehicle of claim 6, wherein "a$_i$x$_i$" defines a first-order parameter indicating an effect a given first operating parameter (x$_i$) has on a production of the particulate matter.

8. The vehicle of claim 7, wherein "b$_i$x$_i$x$_j$" defines a second-order parameter indicating an effect a given cross-term (x$_i$x$_j$) has on the production of the particulate matter.

9. The vehicle of claim 1, wherein the particulate matter includes soot, and the exhaust after-treatment component includes a particulate filter disposed downstream from the internal combustion engine.

10. The vehicle of claim 1, wherein the controller controls a timing at which to activate the regeneration system and regenerate the exhaust after-treatment component based on the amount of the particulate matter in the exhaust gas.

11. A method of determining an amount of particulate matter in exhaust gas output from an internal combustion engine, the method comprising:

performing, via the internal combustion engine, combustion of an air/fuel mixture to generate the exhaust gas;

collecting, via an exhaust after-treatment component, particulate matter contained in the exhaust gas;

obtaining, via a controller, a model of the combustion based on a kinetic controlled combustion phase and a mixing controlled combustion phase;

determining, via the controller, a point on the model with respect to current engine conditions indicating an amount of the particulate matter in the exhaust gas; and initiating a regeneration process, via a regeneration system, based on the indicated amount of particulate matter in the exhaust gas to burn off the collected particulate matter and regenerate the after-treatment component.

12. The method of claim 11, further comprising defining the model of the combustion based on a plurality of first operating parameters selected from a first parameter group and a plurality of second operating parameters selected from a second parameter group different from the first group.

13. The method of claim 12, further comprising determining at least one of the second operating parameters as a cross-term that is based on a combination of at least two of the first operating parameters included in the first parameter group.

14. The method of claim 13, wherein the first operating parameters included in the first parameter group comprise rail pressure (RP), exhaust gas recirculation flow rate (EGR); equivalence air-fuel ratio (EQR); and start of injection angle of the main injection pulse (SOI).

15. The method of claim 14, wherein the second operating parameters comprise a product of EQR and SOI (EQR*SOI), a squared value of EGR (EGR$^2$), a product of EGR and SOI (EGR*SOI), a product of RP and EQR (RP*EQR), a product of RP and SOI (RP*SOI), and a squared value of SOI (SOI$^2$).

16. The method of claim 15, wherein the model of the combustion is based on a function of the first and second operating parameters, the function defined as:

$$f(\Sigma a_i x_i + \Sigma b_i x_i x_j + c), \text{ where}$$

x$_i$ is each first operating parameter among the plurality of first operating parameters;

a$_i$ is a first lookup table coefficient corresponding to a given first operating parameter among the first operating parameters;

x$_i$x$_j$ is each cross-term among the plurality of second operating parameters;

b$_i$ is a second lookup table coefficient corresponding to a given second operating parameter among the plurality of second operating parameters; and c is a combustion mode coefficient corresponding to a current combustion mode of the internal combustion engine.

17. The method of claim 16, wherein "a$_i$x$_i$" defines a first-order parameter indicating an effect a given first operating parameter (x$_i$) has on a production of the particulate matter.

18. The method of claim 17, wherein "b$_i$x$_i$x$_j$" defines a second-order parameter indicating an effect a given cross-term (x$_i$x$_j$) has on the production of the particulate matter.

19. The method of claim 18, wherein the particulate matter includes soot, and the exhaust after-treatment component includes a particulate filter disposed downstream from the internal combustion engine.

20. The method of claim 19, further comprising controlling, via the controller, a timing at which to initiate the regeneration system and regenerate the exhaust after-treatment component based on the indicated amount of particulate matter in the exhaust gas.

* * * * *